(12) United States Patent
Lonati et al.

(10) Patent No.: US 7,392,669 B2
(45) Date of Patent: Jul. 1, 2008

(54) CIRCULAR KNITTING MACHINE, PARTICULARLY OF THE MEDIUM-DIAMETER TYPE, WITH IMPROVED NEEDLE ACTUATION

(75) Inventors: Ettore Lonati, Brescia (IT); Fausto Lonati, Brescia (IT); Tiberio Lonati, Brescia (IT)

(73) Assignee: Santoni S.p.A., Brescia (IT)

( * ) Notice: Subject to any disclaimer, the term of this patent is extended or adjusted under 35 U.S.C. 154(b) by 110 days.

(21) Appl. No.: 10/554,405

(22) PCT Filed: Apr. 28, 2004

(86) PCT No.: PCT/EP2004/004476

§ 371 (c)(1),
(2), (4) Date: Feb. 3, 2006

(87) PCT Pub. No.: WO2004/097094

PCT Pub. Date: Nov. 11, 2004

(65) Prior Publication Data

US 2006/0117804 A1    Jun. 8, 2006

(30) Foreign Application Priority Data

May 2, 2003    (IT) .............................. MI03A0089

(51) Int. Cl.
*D04B 9/00*    (2006.01)
(52) U.S. Cl. ............................................. 66/57; 66/8
(58) Field of Classification Search ................. 66/8, 66/38, 40, 216, 217, 57
See application file for complete search history.

(56) References Cited

U.S. PATENT DOCUMENTS

| 3,924,423 | A |   | 12/1975 | Lonati et al. |
| 3,990,270 | A |   | 11/1976 | Paepke |
| 3,992,903 | A | * | 11/1976 | Janda et al. .................... 66/177 |
| 5,425,252 | A | * | 6/1995  | Lonati .......................... 66/219 |
| 7,207,196 | B2| * | 4/2007  | Lonati et al. .................. 66/222 |

* cited by examiner

*Primary Examiner*—Danny Worrell
(74) *Attorney, Agent, or Firm*—Modiano & Associati; Albert Josif

(57) ABSTRACT

A circular knitting machine, comprising a footing with a rotatable, vertical needle cylinder, axial slots on the outer lateral surface of the needle cylinder, that accommodate each a needle, a sub-needle arranged below each needle in a corresponding axial slot connected bilaterally to the needle and having a radial heel, the sub-needle being oscillatable on a radial plane of the needle cylinder, sub-needle actuation cams, for producing movement of the sub-needle along the axial slot to actuate the overlying needle.

21 Claims, 6 Drawing Sheets

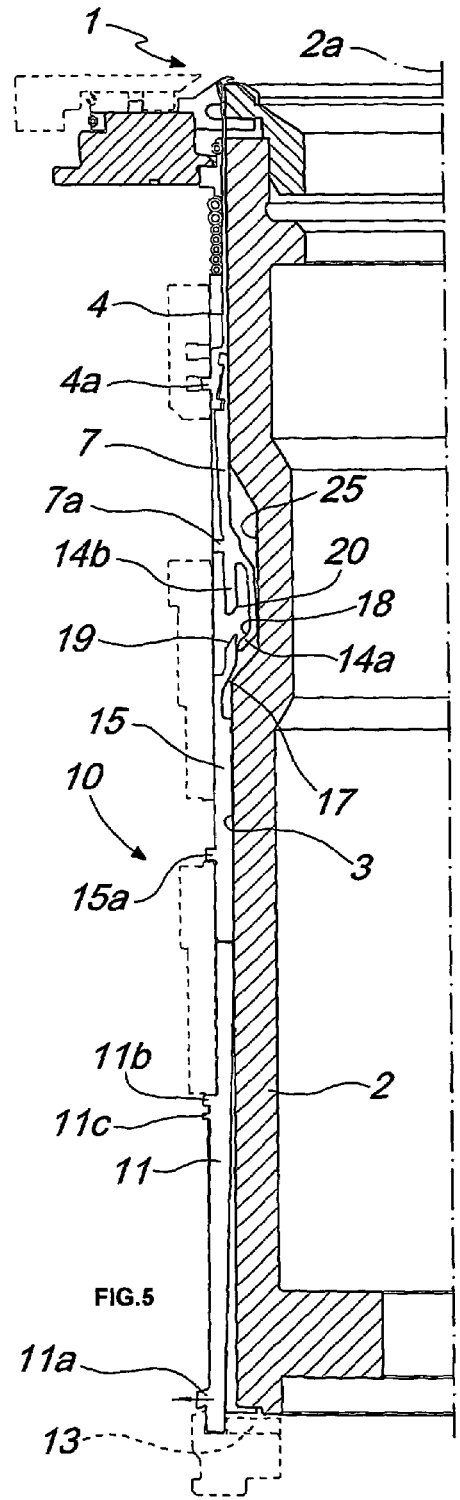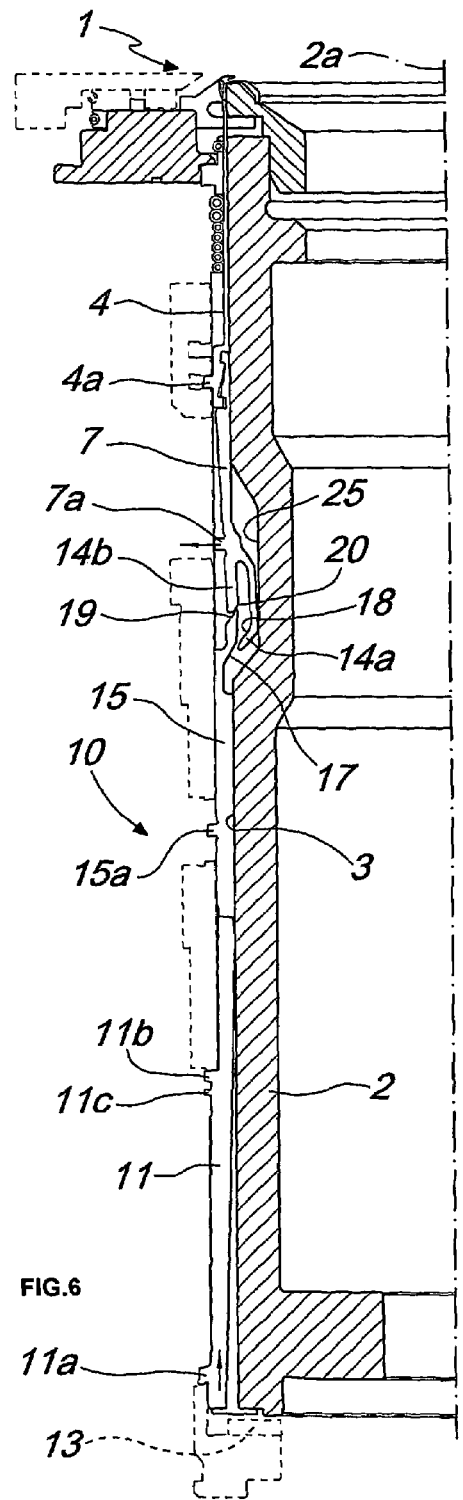

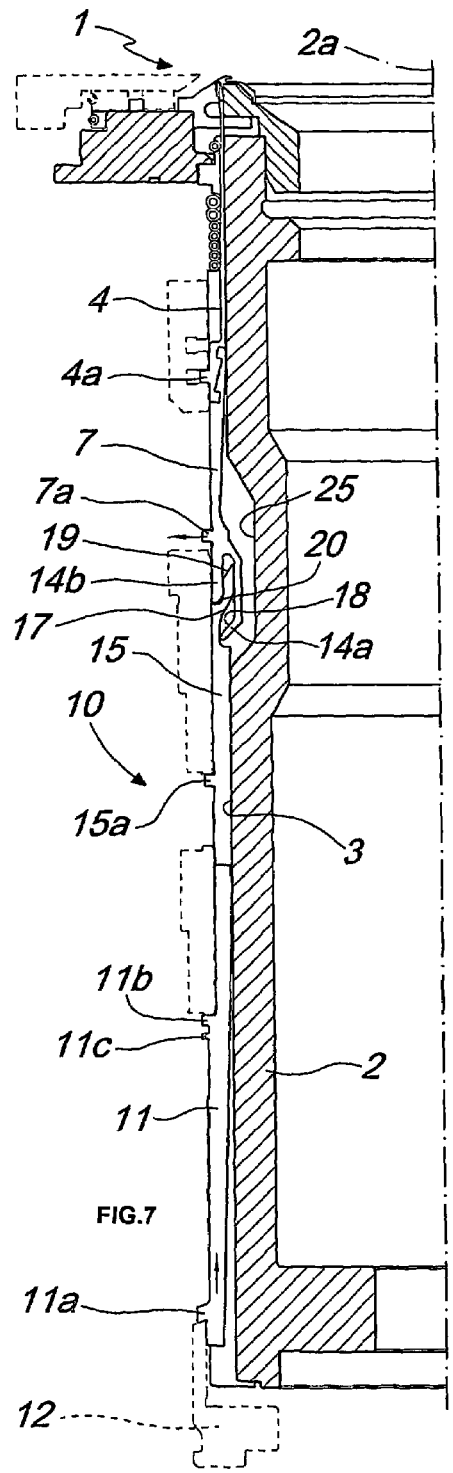
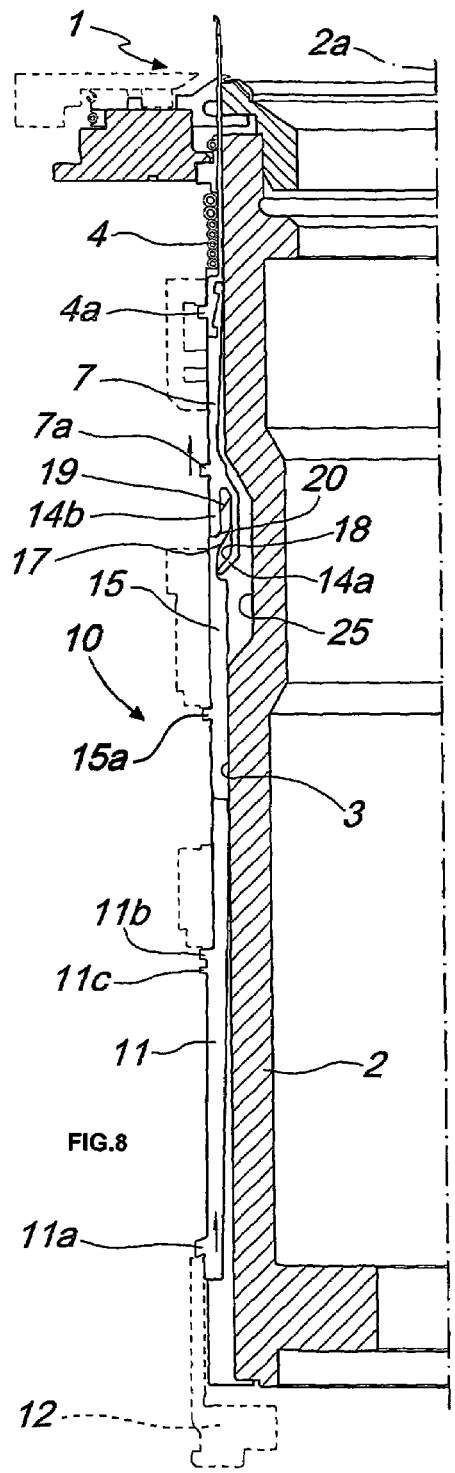
FIG.7
FIG.8

CIRCULAR KNITTING MACHINE, PARTICULARLY OF THE MEDIUM-DIAMETER TYPE, WITH IMPROVED NEEDLE ACTUATION

TECHNICAL FIELD

The present invention relates to a circular knitting machine, particularly of the medium-diameter type, with improved needle actuation.

BACKGROUND ART

The field of circular knitting machine has always felt the need to reduce as much as possible the height of the needle cylinder so as to reduce its inertia, in order to be able to increase its rotation rate and therefore increase correspondingly the productivity of these machines.

However, this need clashes with an equally important need, which is versatility, i.e., the possibility to produce on a same machine various kinds of knitting process, the execution of which often entails increasing even considerably the complexity of the needle actuation system, increasing the space occupation entailed by the installation of several accessories around the needle cylinder, which inevitably force an increase in the height of the needle cylinder, which in practice constitutes the only dimensional variable that allows design freedom.

Furthermore, in circular knitting machines there has always been the need to improve the quality level of the manufactured articles. In recent years, this need, has increased, also because continuous improvements have, allowed these machines to produce items that increasingly approximate finished items, reducing and in some times eliminating the use of subsequent processes.

Furthermore, in needle actuation systems of machines of this type it has been noted that in any kind of knitting process the heel of the needles always engages the lowering cams, i.e., the cams that lower the needle into the needle cylinder after engaging the yarn at a drop or feed of the machine, even when the corresponding needle is excluded from knitting at a drop. This engagement with the lowering cams produces unwanted movements of the needle, and if the needle is holding previously formed knitting these movements can alter or even break the stitches, inevitably penalizing the quality of the product.

DISCLOSURE OF THE INVENTION

The aim of the present invention is to solve the problems noted above by providing a circular knitting machine, particularly of the medium-diameter type, with a particularly simple needle actuation system that allows to contain the axial dimensions of the needle cylinder without penalizing the range of possible types of knitting.

Within this aim, an object of the invention is to provide a machine that can operate at high rotation rates of the needle cylinder and can therefore achieve high production levels.

Another object of the invention is to provide a machine that thanks to a containment of the total weight of the needle cylinder and to the needle actuation system can operate without problems even in the case of medium- and large-diameter machines, with reversals of the direction of rotation of the needle cylinder, allowing types of knitting that have never been performed up to now on these machines, such as for example the provision Of three-dimensional shapes without necessarily having to vary the tightness of the knitting or introducing in preset regions portions of additional courses of knitting that require unsightly trimming that is negative for the fit of the product.

This aim and these and other objects that will become better apparent hereinafter are achieved by a circular knitting machine, which comprises a footing that supports a needle cylinder that can be rotationally actuated with respect to said footing about its own axis, which is orientated substantially vertically; a plurality of axial slots being formed on the outer lateral surface of the needle cylinder, each slot accommodating a needle; means for actuating the needles being provided and interacting with said needles during the rotation of the needle cylinder about its own axis in order to actuate the needles along the corresponding axial slot of the needle cylinder so that the needles form knitting with at least one yarn dispensed to the needles at at least one drop or feed of the machine, characterized in that said needle actuation means comprise, for each needle, a sub-needle arranged in the corresponding axial slot of the needle cylinder below the corresponding needle; said sub-needle being connected bilaterally to the corresponding needle in its motion along the corresponding axial slot and having, along its extension, a heel that is orientated radially with respect to the needle cylinder; said sub-needle being able to oscillate on a radial plane of the needle cylinder in order to pass from an active position, in which it is extracted radially with its heel from the corresponding axial slot of the needle cylinder so as to engage paths formed by sub-needle actuation cams, which are arranged around the needle cylinder and are suitable to produce or allow a movement of said sub-needle along the corresponding axial slot of the needle cylinder, to an inactive position, in which it is embedded with its heel in the corresponding axial slot of the needle cylinder so as to avoid engaging said sub-needle actuation cams; actuation means being provided which act on said sub-needle for its transition from said active position to said inactive position and vice versa.

BRIEF DESCRIPTION OF THE DRAWINGS

Further characteristics and advantages of the invention will become better apparent from the description of a preferred but not exclusive embodiment of the machine according to the invention, illustrated by way of non-limiting example in the accompanying drawings, wherein:

FIG. 5 is a schematic axial sectional view of the needle cylinder of the machine according to the invention, with a sub-needle in the inactive position;

FIG. 6 is a schematic axial sectional view of the needle cylinder of the machine according to the invention, illustrating the transition of the sub-needle from the inactive position to the active position;

FIG. 7 is a schematic axial sectional view of the needle cylinder of the machine according to the invention, with the sub-needle in the active position;

FIG. 8 is a schematic axial sectional view of the needle cylinder of the machine according to the invention, with the sub-needle in the active position during the lifting of the overlying needle.

WAYS TO CARRYING OUT THE INVENTION

Figure 1:
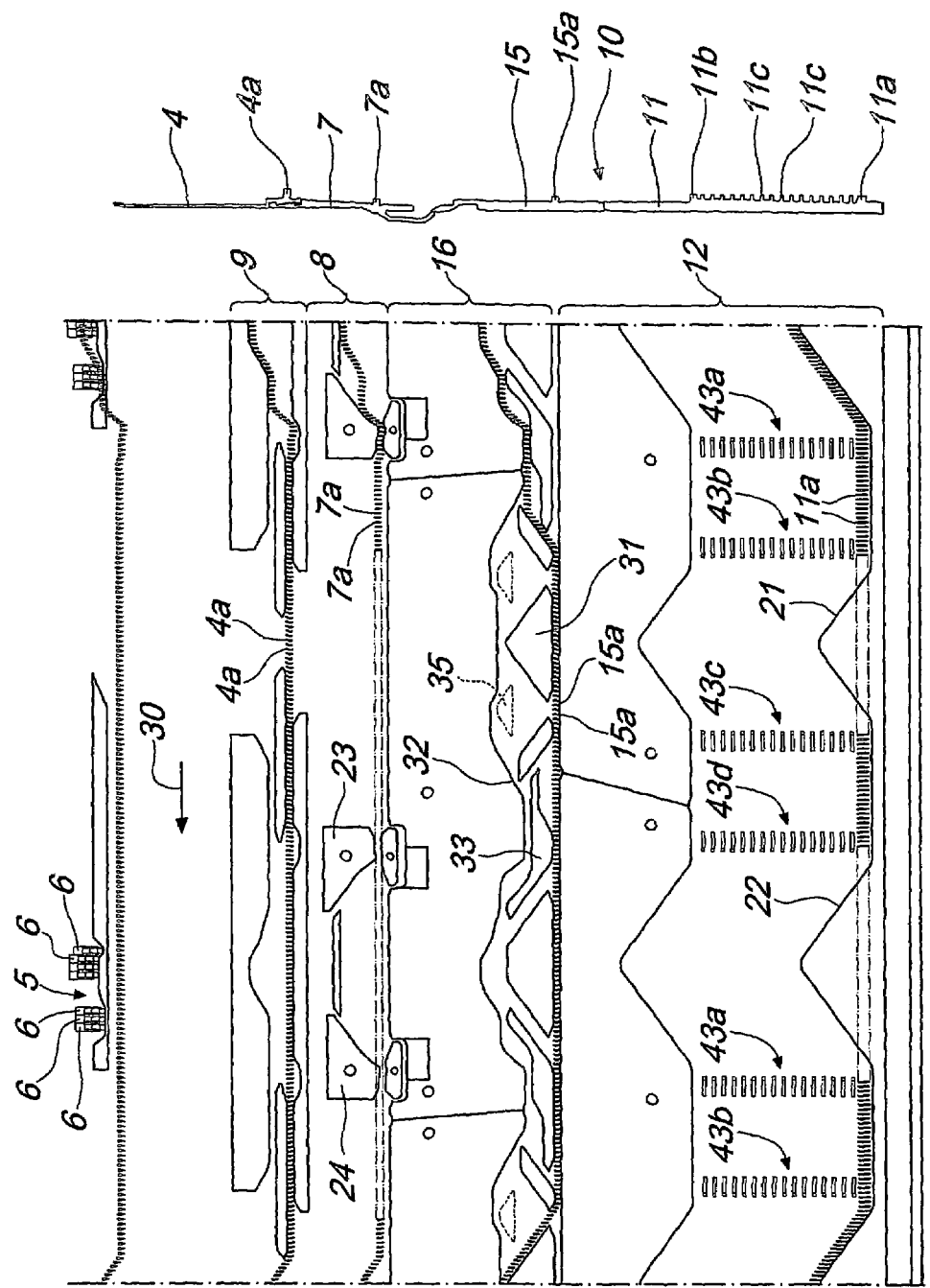
FIG. 1 is a schematic flat projection view of a portion of the cam box of the machine according to the invention, in a first operating condition.

With reference to the figures, the circular knitting machine according to the invention, generally designated by the reference numeral 1 and shown only partially and schematically, comprises, like known types of machine, a footing, which is not illustrated for the sake of simplicity and supports a needle cylinder 2, which can rotate, with respect to the footing, about its own axis 2$a$, which is orientated substantially vertically. Multiple axial slots 3 are formed on the outer lateral surface of the needle cylinder 2 and each slot accommodates a needle 4.

The machine comprises means for actuating the needles 4, which are described in greater detail hereinafter and interact with the needles 4 during the rotation of the needle cylinder 2 about its own axis 2$a$ in order to actuate the needles 4 along the corresponding axial slot 3 so that the needles 4 form knitting with at least one yarn, which is dispensed to the needles 4 at at least one feed or drop 5, which is arranged laterally to the axis 2$a$ and at which appropriately provided yarn fingers 6 are positioned.

According to the invention, the needle actuation means comprise, for each needle 4, a sub-needle 7, which is arranged below the corresponding needle 4 in the same axial slot 3 of the needle cylinder 2. The sub-needle 7 is connected, bilaterally, in its motion along the corresponding axial slot 3, i.e., parallel to the axis 2$a$ of the needle cylinder 2, to the overlying needle 4, and has, along its longitudinal extension, a heel 7$a$, which is orientated radially with respect to the needle cylinder 2. The bilateral connection between the needle 4 and the sub-needle 7 is achieved by virtue of a particular geometric coupling between the upper end of the sub-needle 7 and the lower end of the needle 4. This coupling, in addition to providing said bilateral connection, allows the sub-needle 7 to oscillate on a radial plane of the needle cylinder 2 in order to pass from an active position, in which it is extracted radially with its heel 7$a$ from the corresponding axial slot 3 of the needle cylinder 2, to an inactive position, in which it is embedded with its heel 7$a$ in the corresponding axial slot 3.

Sub-needle actuation cams, generally designated by the reference numeral 8, face and lie around the outer lateral surface of the needle cylinder 2, at a level that corresponds to the level of the heels 7$a$ of the sub-needles 7, are rigidly coupled to the footing of the machine as regards rotary motion about the axis 2$a$, and define paths that are engaged by the heels 7$a$ of the sub-needles 7 when they are in the active position and vice versa are not engaged by the heels 7$a$ of the sub-needles 7 that are in the inactive position. The paths defined by the actuation cams 8 of the sub-needles 7 are shaped so as to force or allow the sub-needles 7, the heels 7$a$ of which engage said paths, an upward or downward motion along the corresponding axial slot 3 of the needle cylinder 2 as a consequence of the rotation of the needle cylinder 2 about the axis 2$a$ with respect to said cams 8.

The needle 4 also has, along its longitudinal extension, a heel 4$a$ that lies radially with respect to the needle cylinder 2 and can engage paths defined by needle actuation cams, generally designated by the reference numeral 9 and rigidly coupled to the footing of the machine as regards rotary motion about the axis 2$a$. Said paths are shaped so as to force or allow the needles 4, the heels 4$a$ of which engage said paths, an upward or downward motion along the corresponding axial slot 3 of the needle cylinder 2 as a consequence of the rotation of the needle cylinder 2 about the axis 2$a$ with respect to the cams 9.

The means for actuating the needles 4 furthermore comprise sub-needle actuation means that act on command on the sub-needle 7 in order to produce its transition from the inactive position to the active position or vice versa.

Said means for actuating the sub-needle 7 comprise, for each sub-needle 7, an actuation element 10, which is arranged in each one of the axial slots 3 below the sub-needle 7 and can move on command along the axial slot 3, i.e., parallel to the axis 2$a$ of the needle cylinder 2, in order to interact with the lower end of the sub-needle 7 and produce its transition or retention in the inactive position or in the active position.

The actuation element 10 comprises a selector 11, which is provided, along its longitudinal extension, with at least one heel 11$a$, 11$b$ that is extended radially with respect to the needle cylinder 2. In the illustrated embodiment, the selector 11 is provided with two heels, respectively a lower heel 11$a$ and an upper heel 11$b$, which are mutually spaced along the longitudinal extension of the selector 11.

The selector 11 can oscillate on a radial plane with respect to the needle cylinder 2 in order to pass from an active position, in which it protrudes radially with its lower heel 11$a$ from the corresponding axial slot 3, to an inactive position, in which it is embedded with its lower heel 11$a$ in the corresponding axial slot 3.

The upper heel 11$b$ is constantly extracted from the corresponding axial slot 3.

Selector actuation cams, generally designated by the reference numeral 12, are arranged so as to face and lie around the needle cylinder 2 at a level that corresponds to the level of the selectors 11, and are rigidly coupled to the footing of the machine as regards rotary motion about the axis 2$a$. The selector actuation cams 12 define paths that can be engaged by the upper heel 11$b$ and by the lower heel 11$a$ when it is in the active position. These paths are shaped so as to force or allow the selectors 11, the heels 11$a$, 11$b$ of which engage said paths, an upward or downward motion along the corresponding axial slot 3 of the needle cylinder 2 as a consequence of the rotation of the needle cylinder 2 about the axis 2$a$ with respect to the cams 12.

The upper heel 11$b$, Which is constantly extracted from the corresponding axial slot 3, is used mainly to actuate the lowering of the selector 11 by means of a part of the selector actuation cams 12.

The selectors 11 have, in a per se known manner, along their longitudinal extension, one or more selection tabs 11$c$, on which selection devices 43$a$, 43$b$, 43$c$, 43$d$ that face the outer lateral surface of the needle cylinder 2 act on command in order to produce the transition of the corresponding selector 11 from the active position to the inactive position. Transition of the selectors 11 from the inactive position to the active position can be achieved in a manner similar to what occurs for oscillating selectors in known types of machine, for example by virtue of extraction cams 13, which are arranged proximate to the lower end of the needle cylinder 2 and act on the lower end of the selectors 11. The selection devices, as well as the extraction cams 13, are arranged upstream of each drop 5 of the machine along the direction of rotation of the needle cylinder 2 about its own axis 2$a$ with respect to the cam box.

The lower end of the sub-needle 7 is conveniently shaped complementarily with respect to the upper end of the actuation element 10, so that a movement of the actuation element 10 along the corresponding axial slot 3 of the needle cylinder 2 produces the transition of the sub-needle 7 from the inactive position to the active position or vice versa.

Conveniently, the lower end of the sub-needle 7 has a forked shape, in which a first prong 14a protrudes downward with respect to the second prong 14b.

The first prong 14a is furthermore closer to the bottom, i.e., to the wall directed toward the axis 2a, of the corresponding axial slot 3, than the second prong 14b. The first prong 14a can be engaged by an upper portion of the actuation element 10 in order to move or stably retain the sub-needle 7 in its inactive position, while the second prong 14b can be engaged by the upper portion of the actuation element 10 in order to move or stably retain the sub-needle 7 in the active position.

Furthermore, the upper portion of the actuation element 10 can be inserted between the two prongs 14a, 14b of the lower end of the sub-needle for the very purpose of reinforcing the retention of the sub-needle 7 in the active position.

Conveniently, the actuation element 10 comprises, in addition to the selector 11, a pusher 15, which is accommodated so that it can slide within the corresponding axial slot 3 of the needle cylinder 2 between the selector 11 and the sub-needle 7.

In practice, the upper portion of the actuation element 10 that engages the lower end of the sub-needle 7 is constituted by the upper portion of the pusher 15.

The pusher 15 has, along its longitudinal extension, a heel 15a that protrudes from the corresponding axial slot 3 of the needle cylinder 2 and can engage paths formed by pusher actuation cams, generally designated by the reference numeral 16, which are rigidly coupled to the footing of the machine as regards rotation about the axis 2a. The paths defined by the actuation cams 16 of the pushers are shaped so as to force, or allow the pushers 15, the heels 15a of which engage said paths, an upward or downward motion along the corresponding axial slot 3 of the needle cylinder 2 as a consequence of the rotation of the needle cylinder 2 about the axis 2a with respect to the cams 16.

The upper portion of each pusher 15 has, in a region that is spaced downward from the upper end of said pusher 15, a first region 17, which forms an inclined plane with respect to the longitudinal extension of the corresponding axial slot 3 and can engage a corresponding region 18 that forms an inclined, plane, and is provided at the lower end of the first prong 14a of the fork of the sub-needle 7, in order to achieve the transition of the sub-needle 7 from the active position to the inactive position as a consequence of the downward movement of the pusher 15 along the corresponding axial slot 3 of the needle cylinder 2.

The upper portion of each pusher 15 furthermore has, at its upper end, a second region 19, which forms an inclined plane with respect to the longitudinal extension of the corresponding axial slot 3 and can engage a corresponding region 20, which forms an inclined plane and is provided at the lower end of the second prong 14b of the fork of the sub-needle 7, in order to achieve the transition of the sub-needle 7 from the inactive position, to the active position as a consequence of the upward movement of the pusher 15 along the corresponding axial slot 3 of the needle cylinder 2.

At the fork of the lower end of the sub-needles 7, the axial slots 3 have, on their bottom, a recessed region 25 for containing said fork and for allowing the oscillation of the sub-needle 7. Optionally, the upper part of said recessed region 25 may be shallower than the remaining part, so as to form a support for the forked region at least in the condition of maximum lifting of the sub-needle 7 that retains it stably in the active position.

The paths defined by the selector actuation cams 12 have, ahead of each drop 5 along the direction of rotation of the needle cylinder 2 about the axis 2a with respect to the cam box, a first rising portion 21 and a second rising portion 22, in which the peak is higher than the peak of the first rising portion 21 in order to produce lifting respectively up to a tuck-stitch lifting level and to a drop-stitch lifting level for the overlying needle 4. The rising portions 21 and 22 are designed to be engaged by the lower heel 11a of the selectors 11 in the active position.

Ahead of each drop or feed 5 of the machine along the direction of rotation of the needle cylinder 2 about its own axis 2a with respect to the cam box, four selection devices are provided: two of said devices are located between the first rising portion 21 and the second rising portion 22.

Preferably, the knitting forming cams, also known as lowering cams, i.e., the cams that produce the descent of the needles after engaging the yarn at a drop, in the machine according to the invention, are part of the actuation cams 8 of the sub-needles 7.

The lowering cams can be movable on command, in a per se known manner, parallel to the axis 2a in order to vary the tightness of the knitting.

Preferably, the machine according to the invention has four drops or feeds 5, which are mutually angularly spaced around the axis 2a of the needle cylinder 2.

In the machine according to the invention, the needle actuation means 4 allow to simplify the cam box and the accessory elements that are usually arranged around the needle cylinder and at the same time allow to perform substantially all the knitting processes currently possible in knitting machines, obtaining qualitatively superior results, as well as knitting processes that currently cannot be obtained on circular knitting machines having a medium diameter or more specifically having a diameter substantially comprised between 7 and 24 inches.

Without altering the fact that the machine according to the invention, with its particular needle actuation means, may be provided with any diameter and as a machine in which the needle cylinder can be actuated with a rotary motion in a single direction of rotation without thereby abandoning the scope of the protection of the present invention, the particular means for the actuation of the needles of the machine according to the invention allow to contain the height and therefore the inertia of the needle cylinder, allowing its rotary actuation about its axis 2a in both directions of rotation. Said means for the actuation of the needles 4, in view of the way in which they are structured, can be used to allow the needles 4 to form knitting in both directions of rotation of the needle cylinder 2 about its own axis 2a at at least one drop 5.

The embodiment of the machine according to the invention shown in the accompanying drawings indeed refers to a machine with a needle cylinder 2 which, depending on the knitting requirements, can be actuated with a continuous motion in one direction of rotation or in the opposite direction or with an alternating motion (or oscillating motion) about its own axis 2a.

In this embodiment, at at least one drop and preferably at each drop, there are two mutually opposite lowering cams 23 and 24 for lowering the needles after the yarn has been engaged at the drop being considered; said cams are designed to be used respectively in the rotary motion of the needle cylinder 2 in one direction or in the opposite direction.

It is possible to use, for the actuation of the needle cylinder 2 with a rotary motion about its own axis 2a, an electric motor of a known type that allows to reverse the rotation of its output shaft, or said rotary motion reversal can be achieved by virtue of a transmission interposed between the motor and the needle cylinder 2.

The needle cylinder 2 can be provided, in a per se known manner, with means for controlling its angular position about the axis 2a, such as for example devices such as encoders or the like, so as to allow to control the position of the various needles 4 about the axis 2a during the rotation of the cylinder 2.

The machine is preferably provided with an actuation and control element of the programmable electronic type, which supervises the operation of the various elements of the machine so as to be able to perform knitting according to preset programs.

The means for actuating the needles 4, described earlier, can be used to actuate the needles 4 so that they form knitting in both directions of the rotation of the needle cylinder 2 about its own axis 2a at all the drops 5.

FIGS. 1 to 4, described in greater detail hereinafter, illustrate in a flat projection view a portion of the cam box of the machine. The illustrated portion relates to a little more than one drop 5, and preferably this configuration of the cams is repeated as regards the other drops of the machine.

In practice, in a machine equipped with needles and needle actuation means according to the invention and meant to be used to form knitting in both directions of rotation of the needle cylinder 2 about its own axis 2a, the arrangement and configuration of the needle actuation cams 9, of the sub-needle actuation cams 8, of the pusher actuation cams 16 and of the selector actuation cams 12 is preferably symmetrical with respect to a radial plane of the needle cylinder that passes through a drop or feed. A similar symmetry also occurs in the arrangement of the selection devices 43a, 43b, 43c, 43d.

The machine is completed with the elements that are usually present in circular knitting machines of this type, such as for example sinkers, fabric tensioning devices, various control systems, etcetera.

Optionally, the machine can be equipped with needles 4, sub-needles 7 and pushers 15 that have mutually different heel lengths.

Merely by way of example, FIGS. 1 to 4 illustrate four different operating conditions of a needle of the machine according to the invention. The direction of rotation of the needle cylinder 2 in the various figures is indicated by the arrow 30. The portions of the paths of the heels of the various elements in the active position have been shown by means of solid bars, while the portions of the paths of the heels of the various elements in the inactive position have been shown by means of broken lines. The needle 4, the sub-needle 7, the pusher 15 and the selector 11 have been shown, laterally with respect to the cam box portion, turned through 90° in a merely exemplifying position, since the position of these elements can vary according to the imparted actuation, as described below.

FIG. 1 illustrates the condition in which the needle is excluded from knitting at a drop or feed 5 of the machine. To achieve this condition, the selector 11 of the needle 4 being considered is retained in the inactive position by way of the selection devices. In this manner, the pusher 15, ahead of the drop being considered, is first lowered together with the sub-needle 7 and then returned to the lowermost position, causing the transition of the sub-needle 7 to the inactive position. In this manner, the corresponding needle 4 passes with its head below the lowering plane of the sinkers of the machine.

It should be noted that in this operating condition the heel 7a of the sub-needle 7 does not engage the lowering cams 23, 24, thus avoiding even small movements of the needle excluded from knitting, which occur in known types of machine and cause accidental breakage of the fabric when the needles that are excluded from knitting at the feed being considered carry knitting formed at other feeds of the machine.

Figure 2:
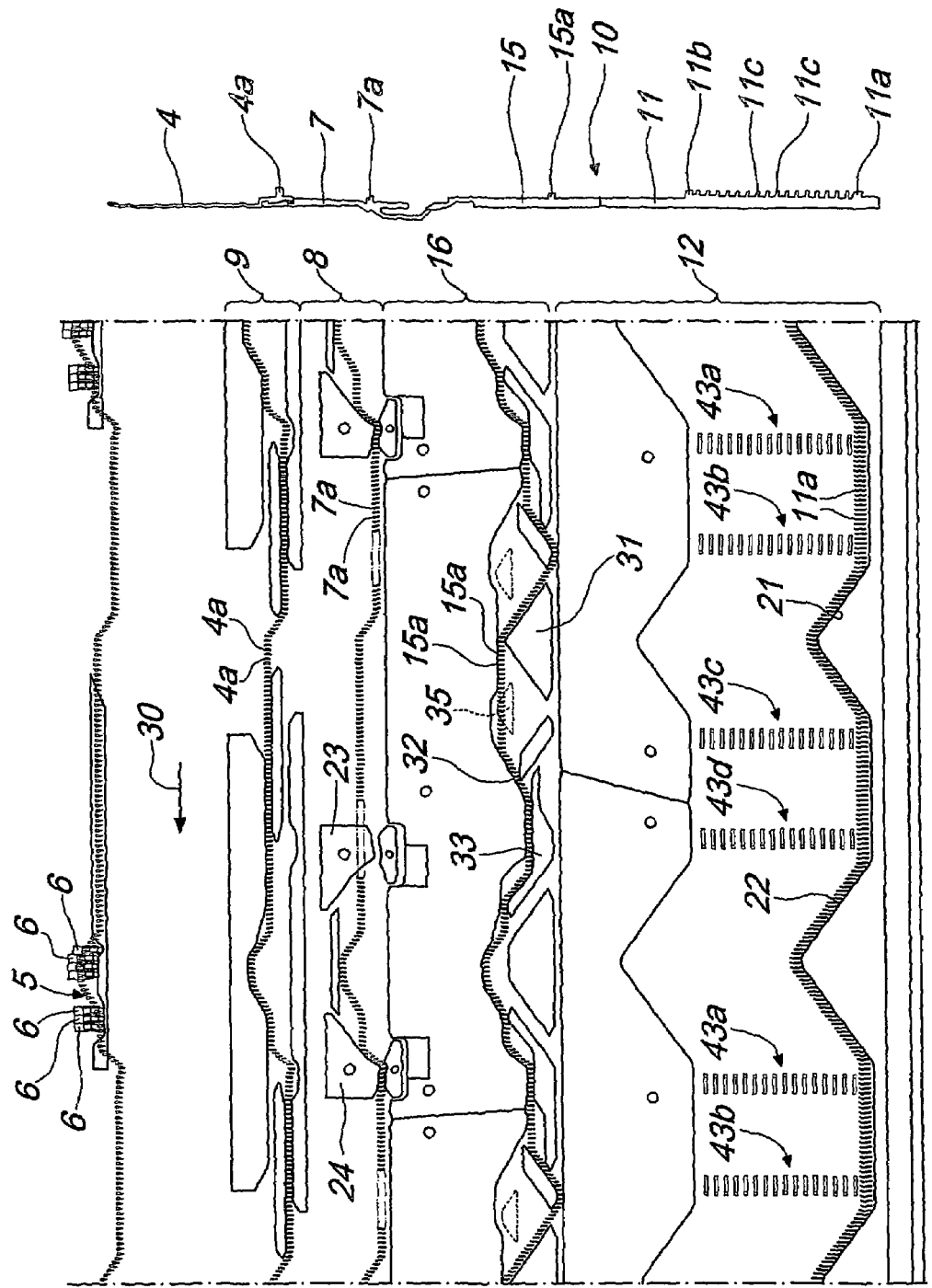
FIG. 2 is a schematic flat projection view of a portion of the cam box of the machine according to the invention in a second operating condition.

FIG. 2 illustrates the actuation of a needle 4 for forming a drop stitch.

In this case, the selector 11 of the needle 4 being considered is retained or moved into the active position by means of the selection devices so that its lower heel 11a engages both the rising portion 21 and the rising portion 22 of the path defined by the cams 12. In this manner, the pusher 15, after being lifted by the upward motion of the selector 11 engaged with the first rising portion 21 and assisted by a cam 31 of the actuation cams 16 of said pusher 15, is lowered by a cam 32 that again belongs to the cams 16 and causes the momentary transition of the sub-needle 7 into the inactive position in order to allow it to move beyond the lowering cam 23 without engaging it. The additional lifting produced by the engagement of the pusher 15 with the cam 33, which again belongs to the actuation cams 16 of the pusher 15, and of the selector 11 with the rising portion 22, produces the lifting of the needle 4 up to the point where the previously formed loop of knitting is dropped onto the stem of the needle 4 before the needle 4 takes the yarn dispensed at the drop being considered and begins a new descent.

Figure 3:
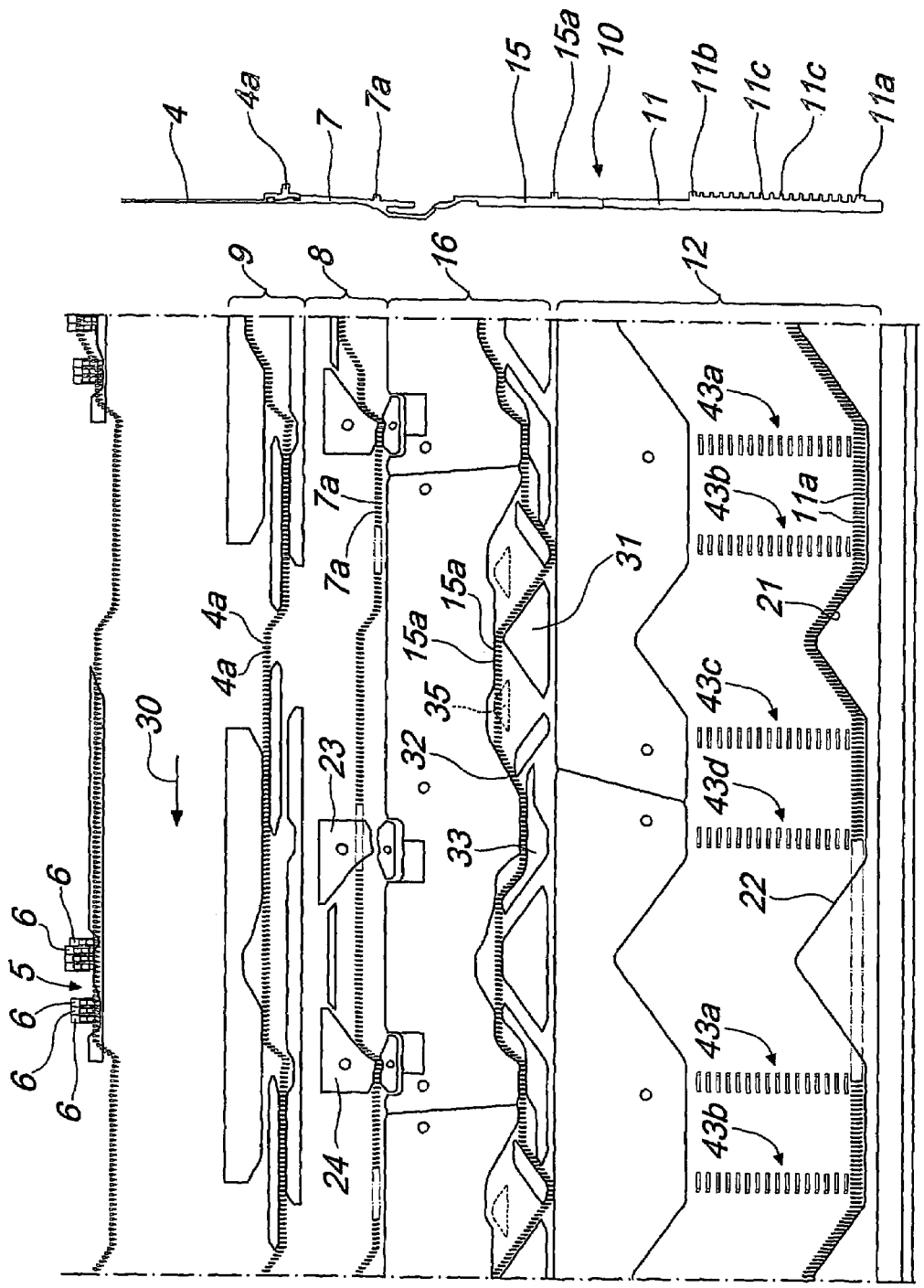
FIG. 3 is a schematic flat projection view of a portion of the cam box of the machine according to the invention in a third operating condition.

FIG. 3 illustrates the actuation of a needle to form a tuck stitch.

In this case, the selector 1, by virtue of the selection devices, is engaged only with the rising portion 21. In this manner, the pusher 15 behaves as in FIG. 2, except that at the drop 5 it does not receive the further upward motion that would be produced by the engagement of the selector 11 with the cam 22. For this reason, the needle 4 is raised to a lesser extent, and the loop of knitting is not dropped onto the stem of the needle 4 before taking a new yarn at the drop or feed being considered, but remains in the hook of the needle 4, which forms a new loop of knitting.

Figure 4:
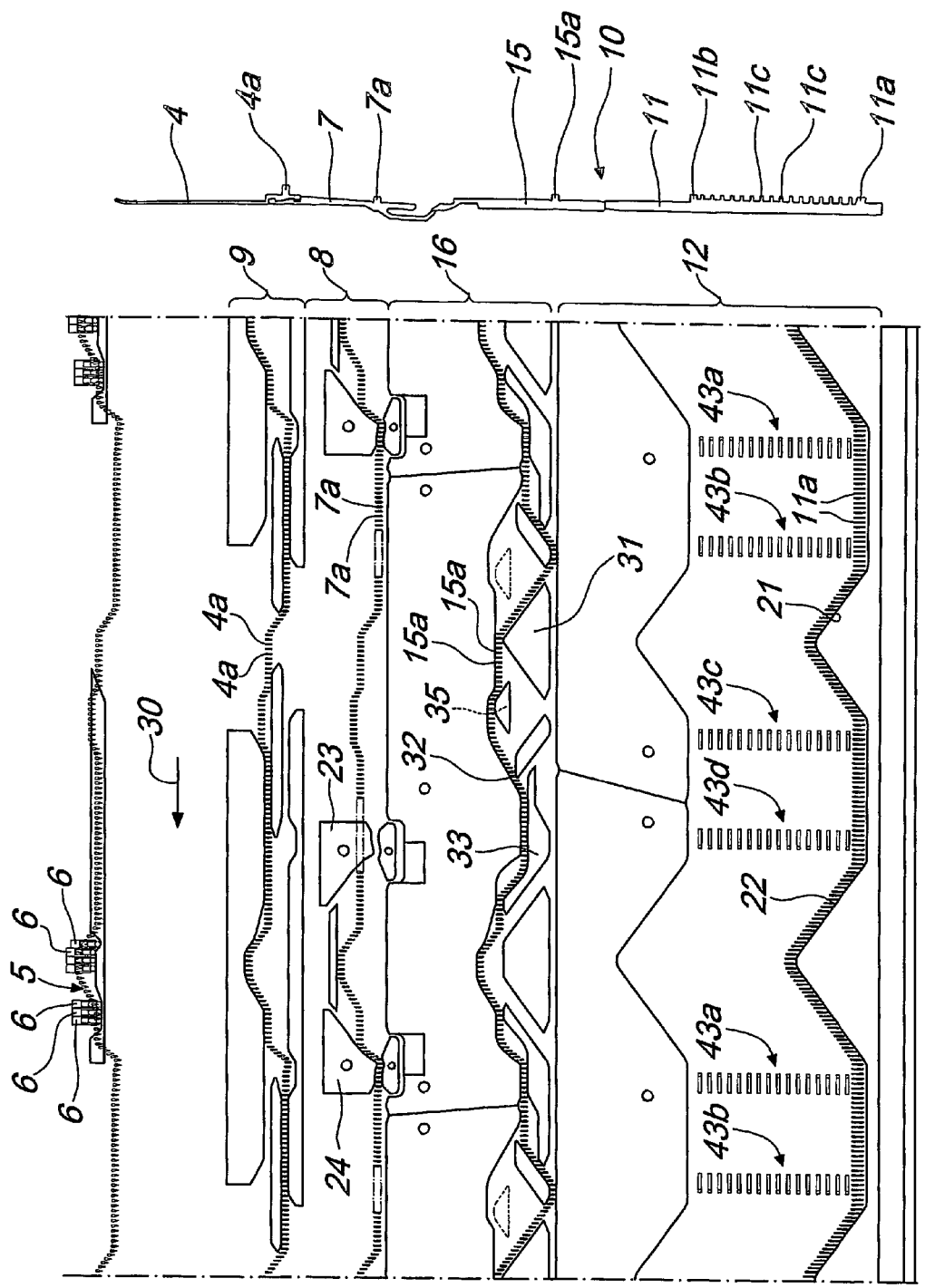
FIG. 4 is a schematic flat projection view of a portion of the cam box of the machine according to the invention in a fourth operating condition.

FIG. 4 illustrates the actuation of a needle to form a floated stitch.

In this case, the actuation of the various elements is similar to the one described with reference to FIG. 2, except that a movable cam 35 is inserted so as to act between the pusher actuation cams 16, causing a greater lifting of the needle 4 before it reaches the drop 5. Said greater lifting of the needle 4 has the effect of causing the transfer of the previously formed loop of knitting onto the stem of the needle 4 below the latch. In this condition, the needle 4 can then be actuated, by way of the selection device 43d, so as to reach a drop-stitch level, or can be retained at a tuck-stitch level. These two levels of lifting of the needle 4 can be used to make the needle engage different yarns dispensed at the drop 5, for example in order to make it engage two yarns when performing drop-stitch lifting and a single yarn when performing tuck-stitch lifting.

FIG. 4 illustrates the lifting of the needle 4 to the drop-stitch level.

It should be noted that in the machine according to the invention, the needle actuation means, constituted by the sub-needles, pushers and selectors, and the arrangement and distribution of the functions of the actuation cams of these elements allow to have as many as four selection points, two for each direction of rotation of the needle cylinder about its own axis, at each feed of the machine, with selection devices that can be arranged at the same vertical elevation.

Furthermore, the set of needle actuation means allows to contain considerably the height of the needle cylinder and therefore to contain the inertia of the needle cylinder, allowing its actuation with an alternating rotary motion, even at relatively high speeds, about its own axis.

The possibility to rotationally actuate the needle cylinder in both directions of rotation and in particular the possibility to actuate the needle cylinder with an alternating rotary motion about its own axis allows to produce without problems three-dimensional shapes on the tubular articles that can produced with the machine, and to produce reinforced regions without varying the tightness of the knitting and without having to produce portions of courses of knitting to be trimmed.

In alternating motion, for producing contoured pouches, it is possible to perform knitting with progressive increases and decreases of the active needles simply by using the needle selection possibilities offered by the machine with adequate programming of the operation of the selection devices.

In addition to these possibilities, the machine according to the invention is capable of producing intarsia knitting, plated fabrics, Jacquard knitting on three technical tracks, striped fabrics, tuck-stitch knitting and floated-stitch knitting.

In practice it has been found that the machine according to the invention fully achieves the intended aim, since the particular needle actuation system allows to simplify the cam box, to contain the vertical space occupation of the needle cylinder, to perform the knitting processes that can be performed by currently commercially available machines and also knitting processes that currently cannot be obtained in medium-diameter circular machines.

In particular, the needle actuation system of the machine according to the invention is suitable to be used to perform needle cylinder actuation in both directions of rotation, allowing to produce, even on medium- and large-diameter machines, articles that have three-dimensional shapes without necessarily resorting to variations in the tightness of the knitting and without requiring the execution of additional portions of courses with yarn trimming. The machine according to the invention also allows to perform intarsia knitting, i.e., knitting with colored designs without floated yarns on the reverse side.

The machine according to the invention is therefore capable of producing items of clothing of superior quality with respect to what can be achieved with circular knitting machines of a conventional type.

The machine thus conceived is susceptible of numerous modifications and variations, all of which are within the scope of the appended claims; moreover, all the details may be replaced with other technically equivalent elements.

In practice, the materials used may be any according to requirements and to the state of the art.

The disclosures in Italian Patent Application No. MI2003A000899 from which this application claims priority are incorporated herein by reference.

The invention claimed is:

1. A circular knitting machine, comprising: a footing; a needle cylinder supported on said fooling and rotationally actuatable, with respect to said footing about an axis thereof, which is orientated substantially vertically; a plurality of axial slots being formed on an outer lateral surface of the needle cylinder, each slot accommodating a needle; actuating means for actuating the needles provided and interacting with said needles during rotation of the needle cylinder about said axis thereof in order to actuate the needles along a corresponding axial slot of the needle cylinder so that the needles form knitting with at least one yarn dispensed to the needles at at least one drop or feed of the machine; and wherein said needle actuation means comprise, for each needle, a sub-needle arranged in the corresponding axial slot of the needle cylinder below said needle; said sub-needle being connected bilaterally to the needle for motion along the corresponding axial slot and having, along an extension thereof, a heel that is orientated radially with respect to the needle cylinder; sub-needle actuation cams, said sub-needle being able to oscillate on a radial plane of the needle cylinder in order to pass from an active position, in which the sub-needle is extracted radially with the heel thereof from the corresponding axial slot of the needle cylinder so as to engage paths formed by said sub-needle actuation cams, which are arranged around the needle cylinder and are suitable to produce, or allow a movement of said sub-needle along the corresponding axial slot of the needle cylinder, to an inactive position, in which the sub-needle is embedded with the heel thereof in the corresponding axial slot of the needle cylinder so as to avoid engaging said sub-needle actuation cams; and sub-needle actuation means which act on said sub-needle for transition thereof from said active position to said inactive position and vice versa, wherein said actuation means for actuating the sub-needle comprises an actuation element that is arranged in each one of said axial slots below a corresponding sub-needle and is moveable on command along the corresponding axial slot in order to interact with a lower end of the sub-needle and produce transition and retention of said sub-needle in said active position or in said inactive position, the lower end of said sub-needle being shaped complementarily to an upper end of said actuation element in order to move said sub-needle from said inactive position to said active position or vice versa as a consequence of an axial movement of said actuation element along the corresponding axial slot of the needle cylinder, and wherein said lower end of said sub-needle is forked, with a first prong that protrudes downward with respect to the second prong; said first prong lying closer to the bottom of the corresponding axial slot of the needle cylinder than said second prong; said first prong being engageable by an upper portion of said actuation element to move or stably retain said sub-needle in its inactive position, and said second prong being engageable by said upper portion of said actuation element to move or stably retain said sub-needle in the active position.

2. The machine according to claim 1, comprising needle actuation cams, said needle having, along an extension thereof, a needle heel that protrudes radially with respect to the needle cylinder which is engageable in paths formed by needle actuation cams that are arranged around the needle cylinder and are suitable to produce or allow movement of the needle along the corresponding axial slot of the needle cylinder.

3. The machine of claim 1, wherein said actuation element comprises: an oscillating selector; selector actuation cams; and at least one selection device provided for each one of the drops or feeds of the machine, said selector being provided, along an extension thereof, with at least one selector heel that protrudes radially with respect to the needle cylinder, said selector being able to oscillate on a radial plane with respect to the needle cylinder in order to pass from an active position, in which the selector protrudes radially with the heel thereof from the needle cylinder so as to engage paths defined by the selector actuation cams arranged around the needle cylinder and suitable to produce or allow a movement of the selector along the corresponding axial slot of the needle cylinder, to an inactive position, in which the selector is embedded with the heel thereof in the corresponding axial slot of the needle cylinder so as to avoid engaging said selector actuation cams, and vice versa, said at least one selection device acting on command on said selector for transition or retention thereof in said active position or in said inactive position.

4. The machine of claim 3, wherein said needle cylinder is actuatable with a rotary motion about the axis thereof in both directions of rotation, and wherein said needle actuation means are adapted to allow the needles to form knitting in both directions of rotation of the needle cylinder about the axis thereof, at at least one drop or feed of the machine.

5. The machine of claim 2, wherein said needle cylinder is actuatable with an alternating rotary motion about the axis thereof.

6. The machine of claim 4, wherein for each one of the drops or feeds of the machine, four selection devices are provided, two for each direction of rotation of the needle cylinder about the axis thereof, said devices acting on command on said selector for its transition or retention in said active position or in said inactive position.

7. The machine of claim 1, wherein said upper portion of said actuation element can be inserted, in the motion of said actuation element along the corresponding axial slot of the needle cylinder, between the two prongs of the fork of the lower end of said sub-needle.

8. The machine of claim 7, wherein said upper portion of said actuation element has, in a region that is spaced from the upper end of said upper portion, a first region that forms an inclined plane with respect to the longitudinal extension of the corresponding axial slot of the needle cylinder and is adapted to engage a corresponding region that forms an inclined plane and is provided at a lower end of said first prong of the fork of the sub-needle for transition of said sub-needle from said active position to said inactive position as a consequence of the downward movement of said actuation element along the corresponding axial slot of the needle cylinder.

9. The machine of claim 7, wherein the upper portion of said actuation element has, at its upper end, a second region that forms an inclined plane with respect to the longitudinal extension of the corresponding axial slot of the needle cylinder and is adapted to engage a corresponding region that forms an inclined plane and is provided at a lower end of said second prong of the fork of the sub-needle for transition of said sub-needle from said inactive position to said active position as a consequence of the upward movement of said actuation element along the corresponding axial slot of the needle cylinder.

10. The machine of claim 7, wherein said actuation element comprises, in addition to said selector, a pusher that is accommodated so as to be slideable in the corresponding axial slot of the needle cylinder between said selector and said sub-needle, said upper portion of the actuation element that is adapted to engage the lower end of said sub-needle being constituted by the upper portion of said pusher.

11. The machine of claim 10, comprising pusher actuation cams arranged around the outer lateral surface of the needle cylinder, said pusher having, along an extension thereof, a pusher heel that protrudes from the corresponding axial slot of the needle cylinder and being adapted to engage paths that are defined by said pusher actuation cams and are shaped so as to produce a motion of said pushers along the corresponding axial slots of the needle cylinder.

12. The machine of claim 11, wherein said sub-needle actuation cams comprise lowering cams to produce downward movement of the needles after engaging yarn at each one of said drops or feeds of the machine.

13. The machine of claim 12, wherein the paths defined by said selector actuation cams have, ahead of each drop or feed, a first rising portion and a second rising portion, a peak of said second rising portion being higher than a peak of said first rising portion for upward movement of the needles respectively to a tuck-stitch lifting level and to a drop-stitch lifting level for an overlying needle, at least one selection device being interposed between said first rising portion and said second rising portion.

14. The machine of claim 13, wherein two selection devices are arranged sequentially between said first rising portion and said second rising portion of the selector actuation cams and is usable selectively depending on a direction of rotation of the needle cylinder about the axis thereof.

15. The machine of claim 13, wherein a bottom of each axial slot of the needle cylinder has a portion that is adapted to be engaged by said sub-needle at least in its fully lifted condition in order to retain said sub-needle in its active position.

16. The machine of claim 14, wherein said selection devices are arranged at a same height.

17. The machine of claim 13, comprising four drops or feeds, which are angularly mutually spaced around the axis of the needle cylinder.

18. The machine of claim 17, wherein said needle actuation means are suitable to allow the needles to form knitting in both directions of rotation of the needle cylinder about the axis thereof at each one of the drops or feeds.

19. The machine of claim 17, wherein said needle actuation cams, said sub-needle actuation cams, said pusher actuation cams and said selector actuation cams have configurations and arrangements that are symmetrical with respect to a radial plane of the needle cylinder that passes through a drop or feed.

20. The machine of claim 19, wherein said selection devices are arranged symmetrically with respect to a radial plane of the needle cylinder that passes through a drop or feed.

21. The machine of claim 1, wherein said needle cylinder has a diameter that is substantially comprised between 7 and 24 inches.

* * * * *